United States Patent
Nakazawa et al.

(10) Patent No.: US 8,640,669 B2
(45) Date of Patent: Feb. 4, 2014

(54) PISTON FOR AN INTERNAL COMBUSTION ENGINE

(75) Inventors: Fumikazu Nakazawa, Wako (JP); Akito Tanihata, Wako (JP); Naoko Sato, Wako (JP); Junya Yoshizawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 281 days.

(21) Appl. No.: 12/675,064

(22) PCT Filed: May 20, 2008

(86) PCT No.: PCT/JP2008/001253
§ 371 (c)(1),
(2), (4) Date: Aug. 10, 2010

(87) PCT Pub. No.: WO2009/028128
PCT Pub. Date: Mar. 5, 2009

(65) Prior Publication Data
US 2011/0139114 A1    Jun. 16, 2011

(30) Foreign Application Priority Data

Aug. 24, 2007 (JP) ................................. 2007-219067
Aug. 24, 2007 (JP) ................................. 2007-219071

(51) Int. Cl.
*F02F 3/10* (2006.01)
*F16J 1/08* (2006.01)

(52) U.S. Cl.
USPC ..................................................... 123/193.6

(58) Field of Classification Search
USPC ................. 92/126, 159, 208, 238; 123/193.6; 29/888.04, 888.048
See application file for complete search history.

(56) References Cited

U.S. PATENT DOCUMENTS 1,016,561 A   2/1912   Grabler
4,694,735 A * 9/1987   Tatematsu et al. .............. 92/208
(Continued)

FOREIGN PATENT DOCUMENTS

DE   102005057754 A1   6/2006
EP       0768458 A2    4/1997
(Continued)

OTHER PUBLICATIONS

Supplementary European Search Report for Application No. 08751771.0, dated Jan. 19, 2011.
(Continued)

*Primary Examiner* — M. McMahon
(74) *Attorney, Agent, or Firm* — Nelson Mullins Riley & Scarborough LLP; Anthony A. Laurentano

(57) ABSTRACT

To provide a piston for an internal combustion engine including a skirt which causes a relatively small frictional resistance and can maintain a favorable frictional property over an extended period of time. In a piston for an internal combustion engine having a skirt 4 on whose sliding surface a resin coating layer is deposited, the skirt 4 comprises a thin walled portion 51 located in a circumferentially middle part thereof and a pair of thick walled portions 52 provided on either lateral side of the thin walled portion 51. The resin coating layer 44 at least in the part thereof deposited on the thick walled portions 52 is formed with a plurality of dimples 45. The skirt may comprise a skirt main body 41 extending axially at a fixed distance from the central axial line of the piston in an axially middle part thereof, and a first reduced diameter portion 42 depending from the lower end of the skirt main body and having a progressively smaller diameter toward a lower end thereof. The dimples 45 may be arranged along a first boundary 6 between the skirt main body and first reduced diameter portion.

9 Claims, 7 Drawing Sheets

(56) References Cited

U.S. PATENT DOCUMENTS

| | | | |
|---|---|---|---|
| 4,760,771 A * | 8/1988 | Felici et al. | 92/159 |
| 5,054,375 A * | 10/1991 | Kawabata et al. | 92/126 |
| 5,894,824 A * | 4/1999 | Watanabe et al. | 123/193.6 |
| 6,357,341 B1 * | 3/2002 | Watanabe et al. | 92/238 |
| 7,287,459 B2 * | 10/2007 | Tabata et al. | 92/159 |

FOREIGN PATENT DOCUMENTS

| | | |
|---|---|---|
| JP | 55-37505 | 3/1980 |
| JP | 4-14748 | 2/1992 |
| JP | 2000-220476 | 8/2000 |
| JP | 2005-320934 | 11/2005 |
| JP | 2005-337468 | 12/2005 |
| JP | 2006-161563 | 6/2006 |

OTHER PUBLICATIONS

European Office Action for Application No. 08751771.0, dated Jan. 28, 2011.

International Search Report for Application No. PCT/JP2008/001253, dated Sep. 2, 2008.

* cited by examiner

PISTON FOR AN INTERNAL COMBUSTION ENGINE

RELATED APPLICATIONS

This application is a 35 U.S.C. 371 national stage filing of International Application No. PCT/JP2008/001253, filed on May 20, 2008, which claims priority to Japanese Patent Application No. 2007-219071 filed on Aug. 24, 2007, and Japanese Patent Application No. 2007-219067 filed on May 20, 2008 in Japan. The contents of the aforementioned applications are hereby incorporated by reference.

TECHNICAL FIELD

The present invention relates to a piston for an internal combustion engine including a skirt having a resin coating layer deposited thereof for reducing frictional resistance.

BACKGROUND OF THE INVENTION

A skirt of a piston controls the tilting movement of the piston which is caused during a reciprocating movement of the piston by slidably engaging the inner wall of the cylinder. Therefore, if the frictional resistance acting on the surface of the skirt is excessive, the frictional load opposing the reciprocating movement of the piston increases, and this could cause a reduction in fuel economy and an excessive wear.

Therefore, it has been proposed to improve the frictional property by depositing a resin coating layer impregnated with solid lubricant on the surface of the skirt, and to form small recesses in the skirt so as to retain lubricating oil in each recess. However, a resin coating layer wears out in time, and a desired frictional property of the skirt cannot be maintained over an extended period of time. Even when recesses are formed in the skirt, oil film cannot be maintained in parts outside the recesses, and the frictional property may not be improved so much as desired.

To overcome such problems, it has been proposed for instance in Japanese patent laid open publication No. 2006-161563 to coat the surface of the skirt of a piston with a layer of resin material formed with a plurality of pits at regular intervals. Thereby, lubricating oil can be retained on the surface of the skirt, and the resulting reduction in the load on the resin coating causes a reduction in wear. Even in parts where oil film does not properly form, the resin coating provides a required frictional property.

BRIEF SUMMARY OF THE INVENTION

Task to be Accomplished by the Invention

However, the surface pressure which the skirt receives from the inner wall of the cylinder is by no means even. Such a non-uniformity in the surface pressure is caused by the behavior of the piston as it reciprocates and the structure of the piston. When a resin coating layer is formed in a part where a high surface pressure is expected, the resin coating tends to be wear out and/or peel off. Also, the lubricating oil is highly effective reducing the frictional resistance. Therefore, depending on the layout of the resin coating and pits, the frictional property and the durability of the resin coating may vary significantly.

The present invention was made in view of such problems of the prior art, and has a primary object to provide a piston for an internal combustion engine including a skirt which causes a relatively small frictional resistance and can maintain a favorable frictional property over an extended period of time.

Means to Accomplish the Task

To achieve such an object, the present invention provides a piston of an internal combustion engine, comprising: a head; a pair of piston pin bore forming walls depending from a diametrically opposing sides of the piston in an axial direction; a pair of skirts depending from a diametrically opposing sides of the piston in the axial direction and extending circumferentially between the piston pin bore forming walls; and a resin coating deposited on an outer surface of each skirt; a plurality of dimples are formed in a part of the resin coating that receives a relatively large load from an inner cylinder wall.

In particular, it is preferred that the part of the resin coating that receives a relatively large load from an inner cylinder wall comprises a part of the skirt having a relatively high rigidity. According to a preferred embodiment of the present invention, each skirt comprises a thin walled portion formed in a circumferentially central part thereof and a pair of thick walled portions formed on either side of the thin walled portion, and the dimples are formed at least in the resin coating deposited on the thick walled portions.

Thus, the dimples serving as reservoir for lubricating oil are arranged in the thick walled portion that is subjected to the highest surface pressure during the reciprocating movement of the piston. The lubrication by the lubricating oil is more effective in reducing friction than that by the resin coating so that the overall lubricating property can be improved. In particular, because any break in the oil film between the resin coating layer and cylinder inner wall in the area where the surface pressure is relatively high can be avoided, and this reduces the wear and other damages to the resin coating layer.

Preferably, the head comprises an annular oil ring groove around a circumference thereof and an oil ejection hole communicating a bottom part of the oil ring groove with an interior of the piston, and the oil ejection holes are provided adjacent to the dimples. Because a relatively large amount of lubricating oil can be retained in the dimples of the thick walled portion, by providing the oil ejection hole so as to axially align with one of the dimples in the thick walled portion, excess lubricating oil can be efficiently removed from this part during the reciprocating movement of the piston, and an appropriate amount of lubricating oil can be maintained in this part.

According to another aspect of the present invention, such an object can be accomplished by providing a piston for an internal combustion engine in which the part of the resin coating that receives a relatively large load from an inner cylinder wall comprises a circumferentially extending ridge line on the outer circumferential surface of the skirt.

According to a preferred embodiment of the present invention, the skirt comprises a skirt main body provided in an axially middle part thereof, the skirt main body extending in the axial direction at an equidistance from the central axial line of the piston, and a first reduced diameter portion depending from the lower end of the skirt main body and defining a progressively diminishing distance to the central axial line of the piston toward a lower end thereof, the ridge line being located in a first boundary between the skirt main body and first reduced diameter portion.

Additionally or alternatively, the skirt may comprise a second reduced diameter portion extending upward from the upper end of the skirt main body and defining a progressively diminishing distance to the central axial line of the piston toward an upper end thereof, the ridge line being located in a second boundary between the skirt main body and second reduced diameter portion.

Thereby, the skirt is given with a barrel shape with the skirt main body protruding radially as compared with the remaining part thereof. As the piston having such a skirt reciprocates in a cylinder, the first and second boundaries and lower part of the skirt are pressed more forcibly against the cylinder inner wall than other parts of the skirt. By providing the dimples in the parts which are relatively forcibly pressed against the cylinder inner wall, an adequate amount of lubricating oil can be supplied to such parts, and the frictional property can be improved. Also, the direct contact between the resin coating layer deposited on the skirt and the cylinder inner wall, and the wear and other damages to the resin coating layer can be minimized.

Preferably, the dimples include those arranged in parallel with the first boundary between the first and second reduced diameter portions. By thus providing the dimples between the first and second reduced diameter portions, the lubricating oil retained by these dimples can be supplied to the parts adjacent to the first and second boundaries so that the shortage of lubricating oil in the parts adjacent to the first and second boundaries can be avoided.

Preferably, the head comprises an annular oil ring groove around a circumference thereof and an oil ejection hole communicating a bottom part of the oil ring groove with an interior of the piston, the oil ejection hole being located so as to axially align with one of the dimples. Because lubricating oil can be particularly favorably retained in the skirt where the dimples are formed, excess lubricating oil can be efficiently removed by providing the oil rejection hole in the axial direction as seen from the dimple, and an appropriate amount of lubricating oil can be maintained.

BRIEF DESCRIPTION OF THE DRAWINGS

Now the present invention is described in the following with reference to the appended drawings, in which.

DETAILED DESCRIPTION OF THE PREFERRED EMBODIMENT(S)

Now the present invention is described in the following in more detail in terms of a concrete embodiment with reference to the appended drawings. In the following disclosure, it is assumed that the head of the piston is directed upward.

Figure 1:
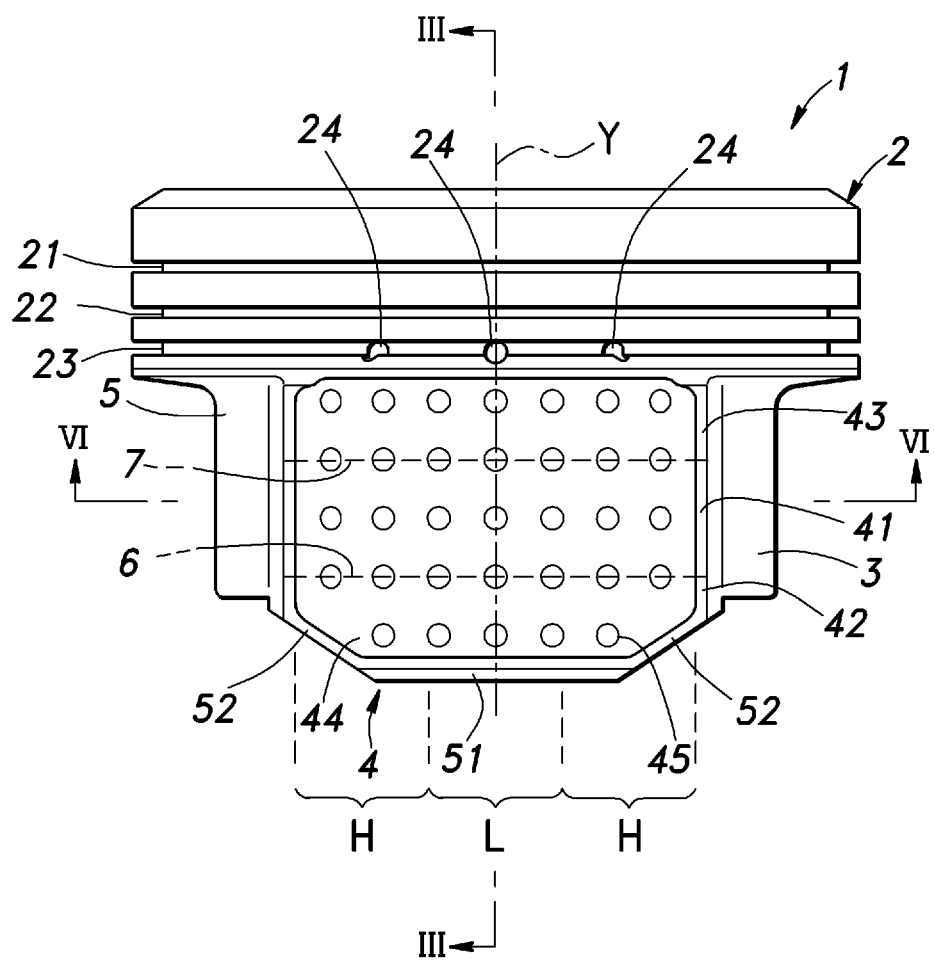
FIG. 1 is a front view of the piston for an internal combustion engine embodying the present invention.
Figure 2:
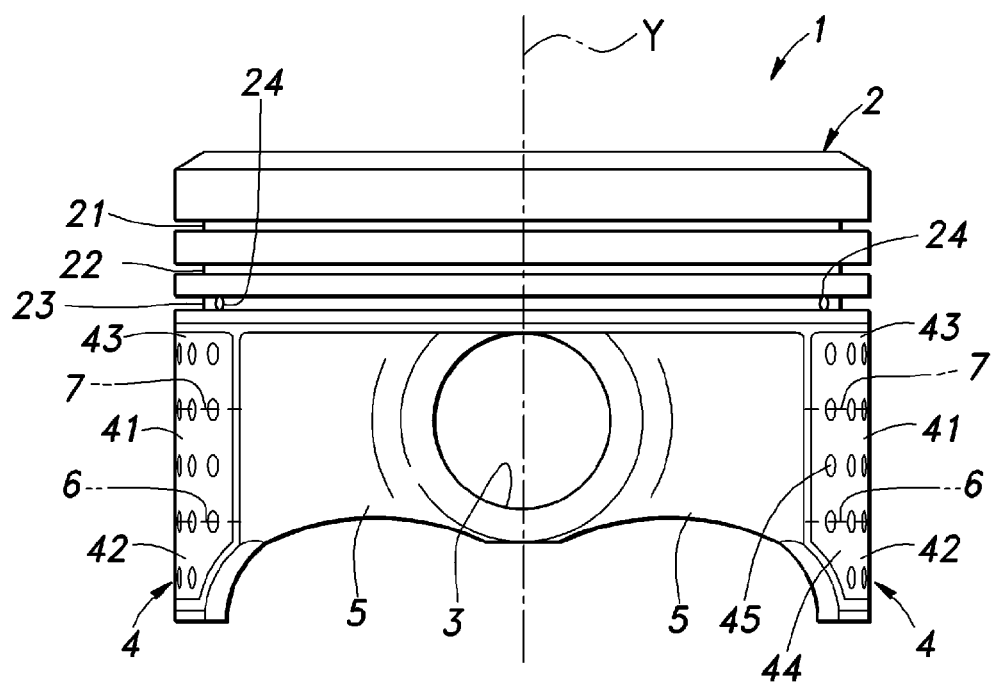
FIG. 2 is a side view of the piston.

As shown in FIGS. 1 and 2, the piston 1 comprises a head 2 for partly defining a combustion chamber in the cylinder of the internal combustion engine, a pair of piston pin bore defining walls 5 depending from diametrically opposing parts of the head 2 and defining a pair of piston pin bores 3 for receiving a piston pin and a pair of skirts 4 depending from diametrically opposing parts of the head 2 in an alternating relationship to the piston pin bore defining walls 5 for slidable engagement with the inner wall of the cylinder. The piston pin bore defining walls 5 extend circumferentially so as to connect the skirts 4 with each other.

Figure 3:
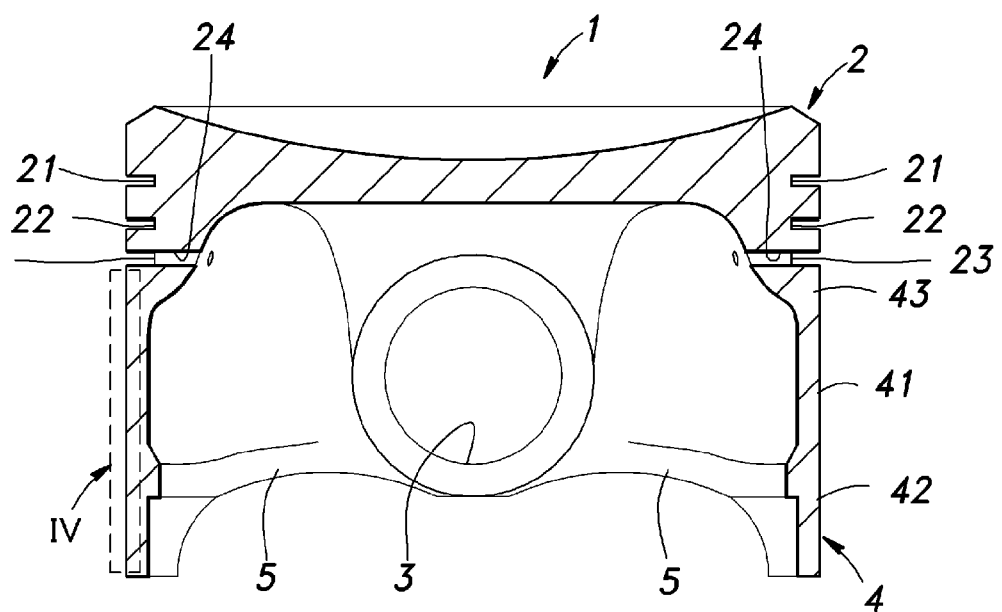
FIG. 3 is a sectional view taken along line III-III of FIG. 1.

As shown in FIG. 3, the head 2 is given with an inverted cup-shape. The upper face of the head 2 is given with an elliptic shape under a room temperature to take into account the thermal expansion thereof that occurs in operation. The circumferential face of the head 2 is formed with three annular grooves including a first compression ring groove 21, a second compression ring groove 22 and an oil ring groove 23, in that order from above. When the piston is installed in an engine, the first and second compression ring grooves 21 and 22 receive corresponding compression rings (not shown in the drawings) while the oil ring groove 23 receives an oil ring (not shown in the drawings) therein.

Figure 5:
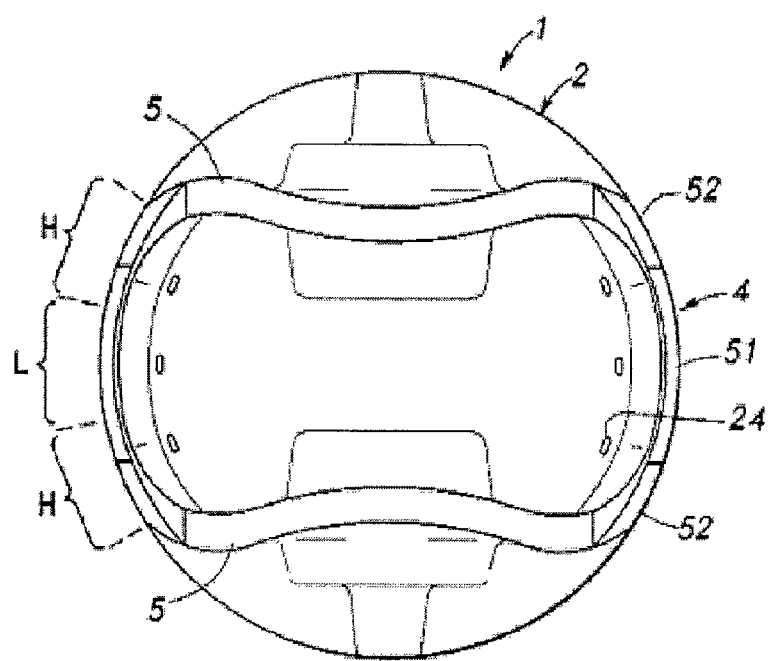
FIG. 5 is a sectional view taken along line V-V of FIG. 1.
Figure 6:
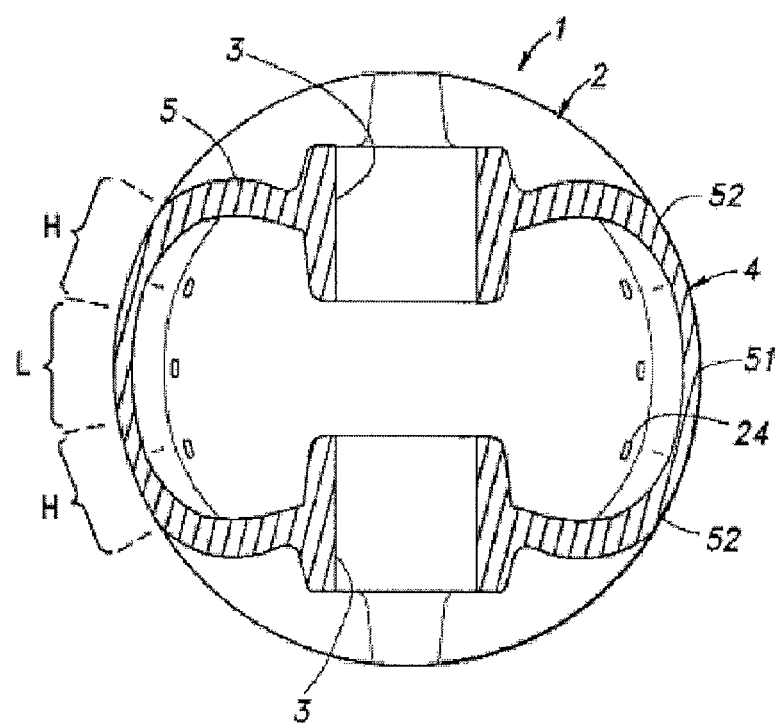
FIG. 6 is further sectional view taken along line V-V of FIG.1.

As shown in FIGS. 5 and 6, the skirt 4 comprises a thin walled portion 51 having a relatively small radial wall thickness in a circumferentially middle part thereof and a pair of thick walled portions 52 having a relatively large radial wall thickness on either side of the thin walled portion 51. The outer side end of each thick walled portion 52 is connected to the adjacent piston pin bore forming wall 5. The skirts 4 are generally given with a substantially elliptic cross section with the short axis aligning with the axial line of the piston pin. The skirts 4 are thus configured to be slidable along the inner wall of the cylinder when subjected to a load therefrom.

Each thick walled portion 52 demonstrates a relatively high rigidity as it is given with a relatively large radial wall thickness and is directly connected to the corresponding piston pin bore forming wall 5, as compared with the thin walled portion 51. Therefore, the circumferentially middle part or the thin walled portion 51 of each skirt 4 may be called as a low rigidity region L while the regions on either side of the thin walled portion 51 or the thick walled portions 52 may be called as high rigidity regions H. In the illustrated embodiment, of the total circumferential length of each skirt 4, the central one third consists of the thin walled portion 51 (low rigidity region L) while the remaining two thirds, on either side of the low rigidity region L consist of the thick walled portions 52 (high rigidity regions H).

Figure 4:
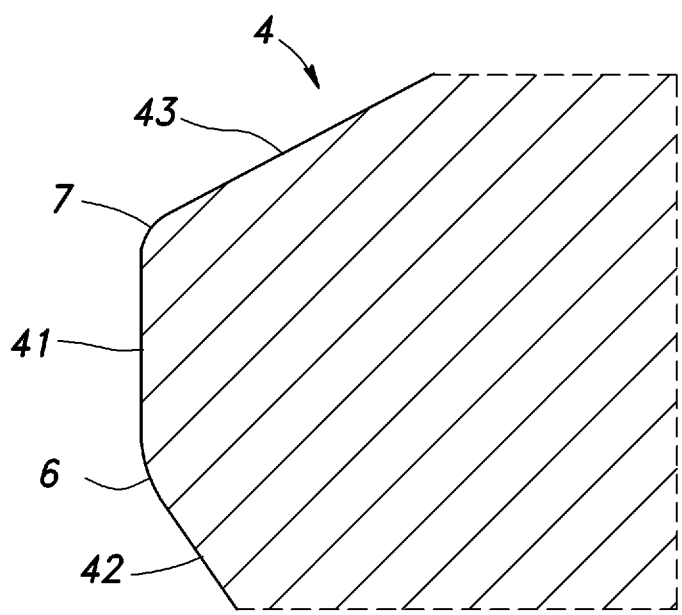
FIG. 4 is a bottom view of the piston.

As shown in FIGS. 1 to 3, the skirt 4 comprises a part-cylindrical skirt main part 41 which extends axially at a substantially equidistance from the axial center line Y of the piston 1. From the lower part of the skirt main part 41 depends a first reduced diameter portion 42 whose diameter progressively diminishes toward the lower end thereof. From the upper part of the skirt main part 41 upwardly extends a second reduced diameter portion 43 whose diameter progressively diminishes toward the upper end thereof. Therefore, as shown in FIG. 4 in a highly exaggerated manner, the skirt main part 41, as seen in the vertical section of the skirt 4, protrudes more radially outward than the remaining part of the skirt 4. In the illustrated embodiment, as seen in the vertical sectional view, the inclination angle of outer circumferential surface of the second reduced diameter portion 43 with respect to the outer circumferential surface of the skirt main part 41 is greater than that of the first reduced diameter portion 42. This sectional shape remains the same substantially over the entire circumference of the piston 1, and the piston 1 is barrel shaped, as far as the skirt 4 thereof is concerned. The boundary between the skirt main part 41 and first reduced diameter portion 42 is named as a first boundary 6, and the boundary between the skirt main part 41 and second reduced diameter portion 43 is named as a second boundary 7 (see FIG. 1). As shown in FIG. 6, in the piston 1, two skirts 4 and two piston pin bore forming walls 5 are connected circumferentially in an alternating manner so that the cross section of the corresponding part of the piston 5 is given with an approximately elliptic shape or a track shape with the short axis aligning with the axial line of the piston pin.

As shown in FIG. 1, a layer of resin coating 44 having a prescribed thickness is deposited on the surface of each skirt 5 that slidably engages the inner wall of the cylinder. The resin coating 44 may consist of resin material of single composition having a low frictional resistance and a high heat resistance, for instance, but may also consist of composite resin material combining solid lubricant with resin material of single composition.

The resin coating 44 is formed with recesses or dimples 45 that are arranged in a regular pattern. Each dimple 45 consists of a part where the resin coating 44 is absent in the illustrated embodiment, but may also consist of a part where the thickness of the resin coating 44 is smaller than the remaining part of the resin coating 44. At any event, each dimple 45 has a prescribed volume. These recesses are called as dimples in this application. Each dimple 45 is circular in the illustrated embodiment, but may also be provided with polygonal or elongated shapes.

A plurality of such dimples 45 are formed in each thick walled portion 52. In the illustrated embodiment, nine dimples are formed in each thick walled portion 52 of each skirt 4. Fifteen dimples are additionally formed in each thin walled portion 51, but it is quite optional and the thin walled portion 51 may be devoid of dimples in other embodiments. It is also possible to arrange dimples densely in the thick walled portion 52 and sparsely in the thin walled portion 51.

In the illustrated embodiment, the dimples 45 are arranged in the axial direction in both the thin walled portion 51 and thick walled portions 52. Such linear arrays of dimples 45 are arranged circumferentially at a regular interval so that the dimples 45 are arranged in a generally grid pattern. The dimples may also be arranged in different patterns in other embodiments.

The oil ring groove 23 is provided with oil ejection holes 24. The oil ejection holes 25 are provided adjacent to the dimples 45. One oil ejection hole 24 is provided axially above each thick walled portion 52. In the illustrated embodiment, another oil ejection hole 24 is provided axially above the thin walled portion 51 as well, but no oil rejection hole may be provided axially above the thin walled portion 51 in other embodiments.

According to another aspect of the present invention, the dimples 45 are arranged on the first boundary 6 and second boundary 7 at a regular interval in each case, and are also arranged in the first reduced diameter portion 42 at a regular interval in parallel with the first boundary 6. The dimples 45 are additionally arranged in the region located between the first boundary 6 and second boundary 7 (or the skirt main body 41) at a regular interval in parallel with the first boundary 6. In the illustrated embodiment, seven dimples are arranged on the first boundary 6, seven dimples on the second boundary 7, five dimples in the lower part of the skirt 4, seven dimples between the first and second boundaries 6 and 7, and seven dimples in the upper part of the skirt 4. The dimples 45 in the upper part of the skirt 4 may be omitted in other embodiments.

The oil ring groove 23 is provided with three oil ejection holes 24, that communicate the oil ring groove 23 with the interior of the piston, adjacent to each skirt 4. The oil ejection holes 24 are located above each skirt 4 and axially align with the corresponding dimples 45.

The mode of operation of the illustrated embodiment is described in the following. The piston 1 in the illustrated embodiment is an ordinary piston, and each skirt 4 of such a piston is subjected to a surface pressure which varies from one location to another as the piston 1 reciprocates and the skirt 4 slidably engages the inner wall of the cylinder. A small clearance is provided between the piston 1 and cylinder so as to avoid seizure between them, and the piston 1 inevitably tilts back and forth as it undergoes the reciprocating movement in dependence on the changes in the position and inclination angle of the connecting rod. More specifically, when one of the skirts is pressed against the inner wall of the cylinder owing to the reciprocating movement of the piston, initially, the surface pressure on the thin walled portion 51 (low rigidity region L) increases. However, because the thin walled portion 51 has a small radial thickness, the thin walled portion 51 relatively readily deforms in a radially inward direction, and this curbs the increase in the surface pressure. On the other hand, each thick walled portion 52 (high rigidity region H) is more resistant to deformation owing to the large radial thickness and the fact that the thick walled portion 52 is connected to the corresponding piston pin bore forming wall 5, as the thin walled portion 51 deforms, the thick walled portion 52 is more forcibly pressed against the cylinder inner wall, and the surface pressure increases.

Figure 7:
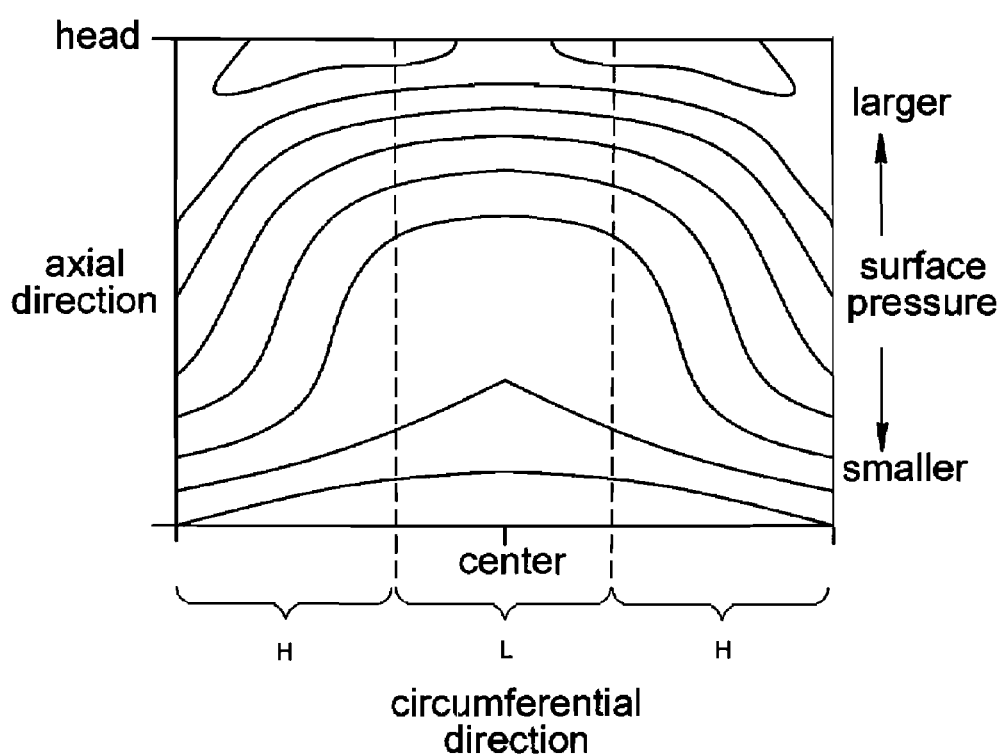
FIG. 7 is a graph showing the distribution of the surface pressure applied to the skirt of the piston.

As shown in FIG. 7, in the skirt 4, the surface pressure of the thick walled portions 52 is generally higher than that of the thin walled portion 51. FIG. 7 shows the distribution of the surface pressure which the skirt 4 receives from the cylinder inner wall with contour lines. The contour lines extend downward toward each circumferentially side part of the skirt 4. It means that the surface pressure increases toward each lateral side along a circumferential line occupying a same axial position. The higher the position is on the skirt 4, the higher the surface pressure is, because the upper end of the skirt 4 is connected to the head 2 and therefore has a high rigidity. As shown in FIG. 7, the region where the surface pressure is relatively uniformly low is located in a central one third of the skirt 4 as seen in the circumferential direction of the piston 1. Therefore, when the skirt is divided into three approximately equal parts along the circumferential direction, the regions of relatively high surface pressure on either side part correspond to the two thick walled portions 52.

In the illustrated embodiment, the parts of the skirt 4 which are subjected to a relatively high surface pressure from the cylinder inner wall as the piston 1 undergoes a reciprocating movement or the thick walled portions 52 are formed with dimples 45. As each dimple 45 has a certain volume, it can serve as a reservoir for retaining lubricating oil. Therefore, the sliding surface of the skirt 4 adjacent to each dimple 45 receives an adequate supply of lubricating oil, and thereby demonstrates very little frictional resistance.

The resin coating is more likely to wear out and/or peel off from the thick walled portions 52 which are subjected to a relatively high surface pressure, but the provision of the dimples 45 reduces the surface area of the resin coating 44, and the resin coating 44 is made less prone to damages. Furthermore, the plentiful supply of lubricating oil from the dimples 45 onto the surface of the resin coating 44 minimizes a direct contact between the resin coating 44 and cylinder inner wall. As a result, the load acting on the resin coating 44 is minimized, and the durability of the resin coating 44 is maximized. Also, the fact that the dimples are arranged along the axial line contributes to the favorable retention of lubricating oil for the sliding surface of the skirt 4.

The provision of the oil ejection holes 24 in the parts of the piston 1 axially above the thick walled portion 52 contributes to an efficient removal of excess lubricating oil from the sliding surface between the piston 1 and cylinder inner wall. A relatively large amount of lubricating oil is retained in the thick walled portions 52, and an appropriate amount of lubricating oil is retained for the sliding surface in this region so that a favorable lubrication in this region can be accomplished. The excess lubricating oil that is collected in the oil ring groove 23 by the oil ring is particularly abundant in the regions axially above the thick walled portions 52 so that it is highly beneficial to remove excess lubricating oil from these regions in an efficient manner.

The behavior of the piston 1 as it undergoes a reciprocating movement is described in the following. In the compression stroke, the piston 1 is pushed against the counter thrust side of the cylinder inner wall as it moves upward in the cylinder. As the compression stroke ends and the expansion stroke begins (or upon reaching the top dead center), the connecting rod moves from the counter thrust side to the thrust side, and this in turn causes the piston 1 to move from the counter thrust side to the thrust side of the cylinder inner wall. During this process, the piston 1 is caused to tilt with respect to the axial line of the cylinder owing to the tilting movement of the connecting rod. As a result, the piston 1 comes into engagement with the thrust side of the cylinder inner wall from the lower part (first reduced diameter portion 42) of the skirt 4.

Thereafter, the piston 1 moves to the bottom dead center while being pushed against the thrust side of the cylinder inner wall. As this time, owing to the tilting movement of the connecting rod, the piston 1 again tilts in such a manner that the point of contact between the thrust side of the cylinder inner wall moves upward from the lower end of the skirt 4 along the skirt 4. Once the piston 1 reaches the bottom dead center, the piston 1 begins to contact the thrust side of the cylinder inner wall at a part adjacent to the second boundary 7 of the skirt 4 of the piston 1. As the piston 1 goes past the bottom dead center, because the connecting rod is now located on the counter thrust side, the piston 1 also begins to contact the counter thrust side of the cylinder inner wall. Because the piston 1 maintains the attitude thereof at the bottom dead center, the piston 4 contacts the counter thrust side of the cylinder inner wall at the lower end portion thereof. Thereafter, the piston 1 moves toward the top dead center while it tilts at the same time. In this manner, the point of the piston 1 that engages the cylinder inner wall changes as the piston 1 undergoes a reciprocating movement.

Owing to the behavior of the piston 1 discussed above and the shape of the skirt 4, the parts of the skirt 4 that experience a relatively high surface pressure are parts adjacent to the first boundary 6 and second boundary 7 and the lower part of the skirt 4. Because the skirt main body 41 projects radially, the parts adjacent to the first and second boundaries 6 and 7 come into engagement with the cylinder inner wall owing to the tilting movement of the piston 1 that occurs during the reciprocating movement thereof, and this causes the high surface pressure on the lower part of the skirt 4. Also, the fact that the lower part of the skirt 4 engages the cylinder inner wall immediately after the piston 1 passes the top dead center and bottom dead center causes the high surface pressure in the parts adjacent to the first and second boundaries 6 and 7

In the illustrated embodiment, the dimples 45 are arranged in parts where the surface pressure is relatively high. As each dimple has a certain volume, it serves as a reservoir for retaining lubricating oil. As a result, the sliding surface of the skirt 4 adjacent to each dimple 45 receives an adequate supply of lubricating oil, and demonstrates a low frictional resistance.

A high surface pressure means a higher risk of damages to the resin coating in such forms as wear and peeling. The provision of dimples 45 reduces the surface area of the resin coating 44, and the parts susceptible to damages can be minimized. The abundant supply of lubricating oil by the dimples 45 to the surface of the resin coating 44 prevents direct contact between the resin coating 44 and cylinder inner wall. Therefore, the load on the resin coating 44 is minimized, and the durability of the resin coating 44 can be improved.

Because the dimples 45 are arranged in the region located between the first and second boundaries 6 and 7, lubricating oil is favorably retained in this region. As this region is adjacent to the first and second boundaries 6 and 7, the first and second boundaries 6 and 7 also receive a supply of lubricating oil. Therefore, lubricating oil is favorable retained in the parts adjacent to the first and second boundaries 6 and 7.

The provision of the oil ejection holes 24 in the part of the piston 1 axially above the dimples 45 promotes an efficient removal of excess lubricating oil from the sliding surface between the piston 1 and cylinder inner wall. Because the skirt 4 formed with the dimples 45 retains a particularly large amount of lubricating oil, the excess lubricating oil collected in the oil ring groove 23 by the oil ring is particularly abundant in the parts of the piston 1 axially above the skirt 5. The retention of an appropriate amount of lubricating oil on the sliding surface ensures a favorable lubrication.

Upon concluding the description of the illustrated embodiment, it should be noted that the present invention is not limited by the illustrated embodiment, but may be implemented in many different ways. For instance, the present invention is also applicable to a pin-offset piston in which the piston pin bore is offset from the center of the piston. Also, the shape, number and layout pattern of the dimples in the illustrated embodiment are purely exemplary, and can be variably modified without departing from the spirit of the present invention.

The contents of the original Japanese patent applications on which the Paris Convention priority claim is made for the present application and the prior art mentioned in this application are incorporated in this application by reference.

The invention claimed is:

1. A piston of an internal combustion engine, comprising:
 a head;
 a pair of piston pin bore forming walls depending from diametrically opposing sides of the head in an axial direction;
 a pair of skirts depending from diametrically opposing sides of the head in the axial direction and extending circumferentially between the piston pin bore forming walls; and
 a resin coating deposited substantially entirely on an outer surface of each skirt;
 a plurality of dimples, which are circular in shape, the plurality of dimples being formed in a part of the resin coating that receives a relatively large load from an inner cylinder wall,
 wherein each skirt comprises a thin walled portion formed in a circumferentially central part thereof and a pair of thick walled portions formed on either side of the thin walled portion, and the dimples are formed at least in the resin coating deposited on the thick walled portions; and
 wherein each skirt comprises:
  a skirt main body provided in an axially middle part thereof, the skirt main body extending in the axial direction at an equidistance from a central axial line of the piston, and
  a first reduced diameter portion depending from a lower end of the skirt main body and defining a progressively diminishing distance to the central axial line of the piston toward a lower end thereof, and the dimples are additionally formed on a circumferentially extending ridge line defined in a first boundary between the skirt main body and the first reduced diameter portion.

2. The piston of an internal combustion engine according to claim 1, wherein the part of the resin coating that receives a relatively large load from an inner cylinder wall comprises a part of the skirt having a relatively high rigidity.

3. The piston of an internal combustion engine according to claim 1, wherein the head comprises an annular oil ring groove around a circumference thereof and an oil ejection hole communicating a bottom part of the oil ring groove with an interior of the piston, the oil ejection hole being located so as to axially align with one of the dimples.

4. The piston of an internal combustion engine according to claim 3, wherein the dimples include dimples axially aligned with the oil ejection hole.

5. The piston of an internal combustion engine according to claim 1, wherein the skirt further comprises a second reduced diameter portion extending upward from the upper end of the skirt main body and defining a progressively diminishing distance to the central axial line of the piston toward an upper end thereof, a second ridge line being located in a second boundary between the skirt main body and second reduced diameter portion.

6. The piston of an internal combustion engine according to claim 5, wherein the dimples include those arranged in parallel with the first boundary between the first and second reduced diameter portions.

7. The piston of an internal combustion engine according to claim 6, wherein the dimples include those arranged in parallel with the first boundary in the first reduced diameter portion.

8. The piston of an internal combustion engine according to claim 7, wherein the head comprises an annular oil ring groove around a circumference thereof and an oil ejection hole communicating a bottom part of the oil ring groove with an interior of the piston, the oil ejection hole being located so as to axially align with one of the dimples.

9. The piston of an internal combustion engine according to claim 1, wherein the dimples are formed only in the part of the resin coating that receives the relatively large load.

\* \* \* \* \*